United States Patent
Sankruthi (10) Patent No.: US 8,443,436 B1
(45) Date of Patent: May 14, 2013

(54) SYSTEMS AND METHODS FOR DIVERTING CHILDREN FROM RESTRICTED COMPUTING ACTIVITIES

(75) Inventor: Anand Sankruthi, Chennai (IN)

(73) Assignee: Symantec Corporation, Mountain View, CA (US)

( * ) Notice: Subject to any disclaimer, the term of this patent is extended or adjusted under 35 U.S.C. 154(b) by 765 days.

(21) Appl. No.: 12/603,047

(22) Filed: Oct. 21, 2009

(51) Int. Cl.
G06F 7/04 (2006.01)

(52) U.S. Cl.
USPC .......... 726/16; 726/26; 726/27; 726/28; 709/203; 709/224; 709/225; 380/247; 380/248; 380/250; 713/155; 713/156; 713/159

(58) Field of Classification Search ............ 709/203, 709/224–225; 703/11; 715/207; 434/350; 726/26–28
See application file for complete search history.

(56) References Cited

U.S. PATENT DOCUMENTS

| | | | |
|---|---|---|---|
| 7,185,192 B1 * | 2/2007 | Kahn | 713/155 |
| 7,290,129 B2 * | 10/2007 | Chebolu et al. | 713/150 |
| 7,640,336 B1 * | 12/2009 | Lu et al. | 709/224 |
| 7,904,554 B1 * | 3/2011 | Lu et al. | 709/224 |
| 8,010,037 B2 * | 8/2011 | Bannwolf et al. | 434/350 |
| 8,074,162 B1 * | 12/2011 | Cohen | 715/207 |
| 2002/0049806 A1 * | 4/2002 | Gatz et al. | 709/203 |
| 2004/0220791 A1 * | 11/2004 | Lamkin et al. | 703/11 |
| 2004/0220926 A1 * | 11/2004 | Lamkin et al. | 707/3 |
| 2005/0060581 A1 * | 3/2005 | Chebolu et al. | 713/201 |
| 2005/0080898 A1 * | 4/2005 | Block | 709/225 |
| 2006/0080524 A1 * | 4/2006 | Kelly et al. | 713/155 |
| 2008/0066164 A1 * | 3/2008 | Chebolu et al. | 726/4 |
| 2008/0182232 A1 * | 7/2008 | Bannwolf et al. | 434/350 |
| 2008/0294439 A1 * | 11/2008 | Kirby | 704/251 |
| 2010/0251281 A1 * | 9/2010 | Craner | 725/23 |
| 2011/0065419 A1 * | 3/2011 | Book et al. | 455/411 |
| 2011/0283311 A1 * | 11/2011 | Luong | 725/28 |
| 2011/0295988 A1 * | 12/2011 | Le Jouan | 709/223 |

* cited by examiner

Primary Examiner — Thu Ha Nguyen
(74) Attorney, Agent, or Firm — ALG Intellectual Property, LLC (57) ABSTRACT

A computer-implemented method for diverting children from restricted computing activities. The method may include maintaining a list of safe computing activities, maintaining a list of restricted computing activities, and detecting a child's attempt to perform a restricted computing activity identified in the list of restricted computing activities. The method may also include selecting a safe computing activity from the list of safe computing activities. The method may further include, in response to the child's attempt to perform the restricted computing activity, blocking the restricted computing activity and initializing the safe computing activity selected from the list of safe computing activities. Various other methods, systems, and computer-readable media are also disclosed.

20 Claims, 5 Drawing Sheets

SYSTEMS AND METHODS FOR DIVERTING CHILDREN FROM RESTRICTED COMPUTING ACTIVITIES

BACKGROUND

Children increasingly use computers in their everyday activities and may access a variety of content through computers. A parent or an organization may deem some content inappropriate for a child and may wish to prevent that child from accessing such content.

If a parent deems computer-accessible content inappropriate, the parent may use parental-control software to block a child from accessing the content's source (e.g., a computer application or a website). However, blocking a child from accessing content may frustrate the child and make the child more curious about how to access the blocked content. In such situations, children may attempt to find ways to circumvent parental control to access blocked content.

SUMMARY

As will be described in greater detail below, the instant disclosure generally relates to systems and methods for diverting children from restricted computing activities. For example, a parental-control system may try to distract a child by diverting the child's attention when the child attempts to perform a restricted computing activity. In some embodiments, a method for diverting children from restricted computing activities may include maintaining a list of safe computing activities and maintaining a list of restricted computing activities. The method may also include detecting a child's attempt to perform a restricted computing activity identified in the list of restricted computing activities and selecting a safe computing activity from the list of safe computing activities. In response to the child's attempt to perform the restricted computing activity, the method may perform the steps of blocking the restricted computing activity and initializing the safe computing activity selected from the list of safe computing activities.

In some embodiments, the list of restricted computing activities may include a list of one or more restricted websites and detecting the child's attempt to perform the restricted computing activity may include detecting an attempt to direct a web browser to a restricted website identified in the list of restricted websites. The list of safe computing activities may include a list of safe websites and selecting a safe computing activity may include selecting a safe website from the list of safe websites. In such embodiments, initializing the safe computing activity may include redirecting the web browser to the safe website.

According to various embodiments, maintaining the list of safe computing activities may include monitoring computing activities of the child and adding one or more computing activities performed by the child to the list of safe computing activities. Additionally or alternatively, maintaining the list of safe computing activities may include identifying one or more computing activities that are most frequently performed by the child and adding the one or more computing activities that are most frequently performed by the child to the list of safe computing activities.

Additionally or alternatively, maintaining the list of safe computing activities may include identifying an interest of the child by monitoring computing activities of the child, identifying a computing activity that is associated with the interest of the child, and adding the computing activity associated with the interest of the child to the list of safe computing activities.

Maintaining the list of safe computing activities may include receiving, via user interface, information identifying an interest of the child, selecting a computing activity associated with the interest of the child, and adding the computing activity associated with the interest of the child to the list of safe computing activities. Additionally or alternatively, maintaining the list of safe computing activities may include receiving, via a user interface, information identifying a computing activity to be added to the list of safe computing activities and adding the computing activity identified via the user interface to the list of safe computing activities.

In some embodiments, selecting a safe computing activity from the list of safe computing activities may include selecting a random computing activity from the list of safe computing activities. Additionally or alternatively, selecting a safe computing activity from the list of safe computing activities may include selecting a computing activity that has not recently been selected to divert the child's attention from a restricted computing activity.

According to various embodiments, the list of safe computing activities may include a URL identifying a safe website. The list of safe computing activities may also identify at least one of a computer game, a media file, a recommendation of a safe computing activity for the child, and/or educational information. In various embodiments, the method may further include providing a notification that provides the child with a reason that the restricted computing activity is being blocked.

According to certain embodiments, a system for diverting children from restricted computing activities may include a storage module programmed to maintain a list of safe computing activities and maintain a list of restricted computing activities. The system may also include a detection module programmed to detect a child's attempt to perform a restricted computing activity identified in the list of restricted computing activities and a selection module programmed to select a safe computing activity from the list of safe computing activities. The system may further include a diversion module programmed to, in response to the child's attempt to perform the restricted computing activity, block the restricted computing activity and initialize the safe computing activity selected from the list of safe computing activities.

In some embodiments, the list of restricted computing activities may include a list of one or more restricted websites and the detection module may be programmed to detect the child's attempt to perform the restricted computing activity by detecting an attempt to direct a web browser to a restricted website identified in the list of restricted websites. According to various embodiments, the list of safe computing activities may include a list of safe websites, the selection module may be programmed to select a safe computing activity by selecting a safe website from the list of safe websites, and the diversion module may be programmed to initialize the safe computing activity by redirecting the web browser to the safe website.

The storage module may be programmed to maintain the list of safe computing activities by monitoring computing activities of the child and adding one or more computing activities performed by the child to the list of safe computing activities. Additionally or alternatively, the storage module may be programmed to maintain the list of safe computing activities by identifying an interest of the child, identifying a computing activity that is associated with the interest of the child, and/or adding the computing activity associated with the interest of the child to the list of safe computing activities.

In certain embodiments, a computer-readable-storage medium may include one or more computer-executable instructions that, when executed by at least one processor of a computing device, cause the computing device to: (1) maintain a list of safe computing activities, (2) maintain a list of restricted computing activities, (3) detect a child's attempt to perform a restricted computing activity identified in the list of restricted computing activities, (4) select a safe computing activity from the list of safe computing activities, and (5) in response to the child's attempt to perform the restricted computing activity, block the restricted computing activity and initialize the safe computing activity selected from the list of safe computing activities.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for diverting children from restricted computing activities. Embodiments of the instant disclosure may present a child with other computing activities and/or information when a child attempts to perform a restricted computing activity. For example, if a child attempts to browse to a restricted website, a parental-control system may redirect the child's web browser to a safe website that may be of interest to the child.

Figure 1:
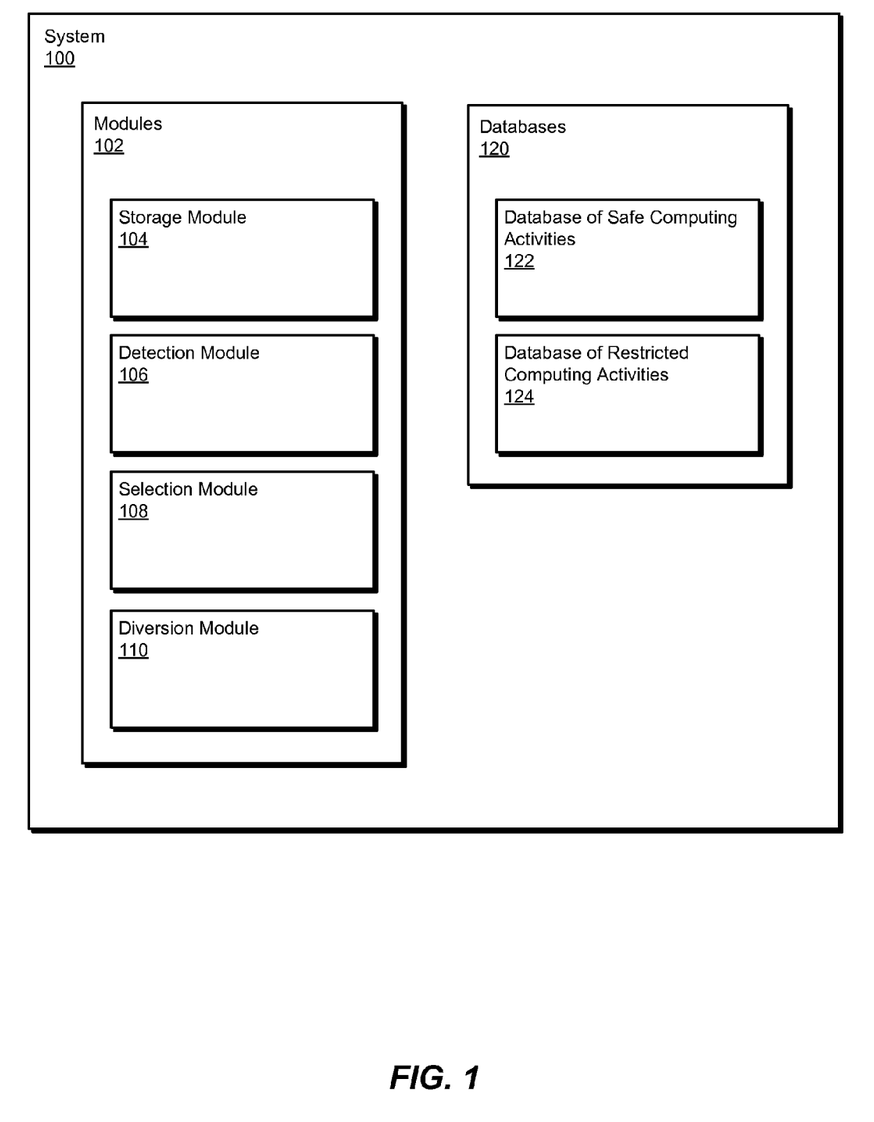
FIG. 1 is a block diagram of an exemplary system for diverting children from restricted computing activities.
Figure 2:
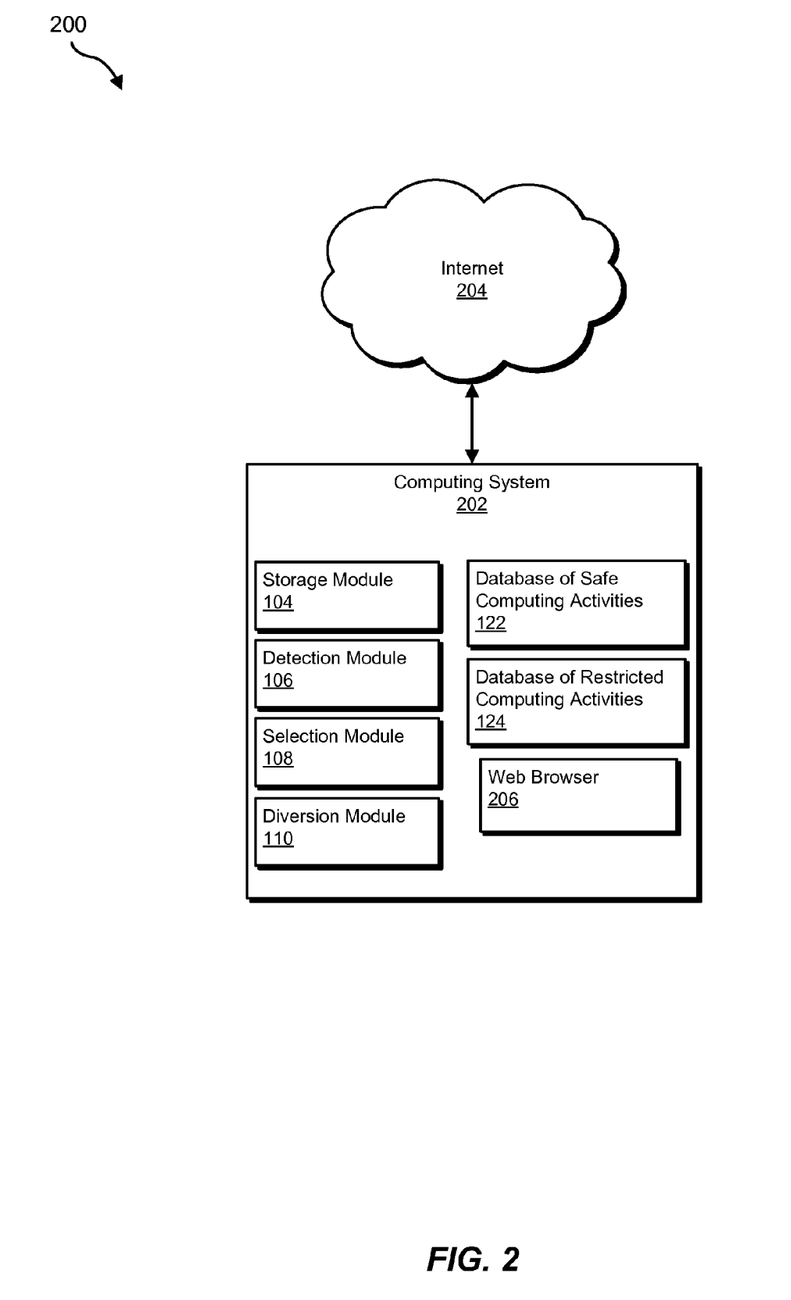
FIG. 2 is a block diagram of an exemplary system for diverting children from restricted computing activities.

The following will provide, with reference to FIGS. 1-2, detailed descriptions of exemplary systems for diverting children from restricted computing activities. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for diverting children from restricted computing activities. As illustrated in this figure, exemplary system 100 may include one or more modules 102 for performing one or more tasks. For example, and as will be explained in greater detail below, exemplary system 100 may include a storage module 104 programmed to maintain a list of safe computing activities and maintain a list of restricted computing activities. Exemplary system 100 may also include a detection module 106 programmed to detect a child's attempt to perform a restricted computing activity identified in the list of restricted computing activities.

In addition, and as will be described in greater detail below, exemplary system 100 may include a selection module 108 programmed to select a safe computing activity from the list of safe computing activities. Exemplary system 100 may also include a diversion module 110 programmed to block the restricted computing activity and initialize the safe computing activity selected from the list of safe computing activities. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 in FIG. 2, computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a database of safe computing activities 122 for storing one or more lists of safe computing activities. System 100 may also include a database of restricted computing activities 124 for storing one or more lists of restricted computing activities.

Databases 120 in FIG. 1 may represent a portion of one or more computing devices. For example, databases 120 may represent a portion of computing system 202 in FIG. 2, computing system 410 in FIG. 4, and/or portions of exemplary network architecture 500 in FIG. 5. Alternatively, databases 120 in FIG. 1 may represent one or more physically separate devices capable of being accessed by a computing device, such as computing system 202 in FIG. 2 computing system 410 in FIG. 4 and/or portions of exemplary network architecture 500 in FIG. 5.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with the Internet 204. In one embodiment, and as will be described in greater detail below, computing system 202 may include storage module 104, detection module 106, selection module 108, diversion module 110, database of safe computing activities 122, and database of restricted computing activities 124. Computing system 202 may also include a web browser 206. The functionality of one or more of the components of computing system 202 may be performed by a remote computing device (e.g., a device in a local area network, in a cloud, etc.).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Figure 3:
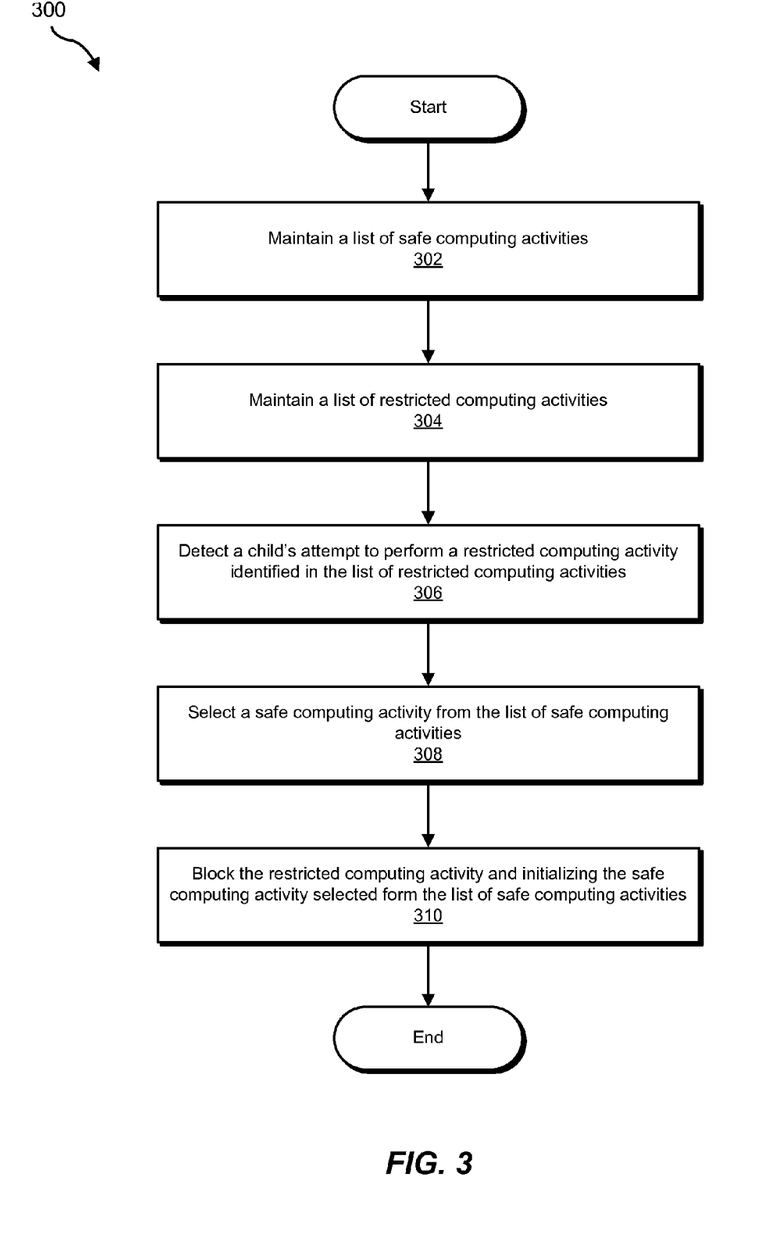
FIG. 3 is a flow diagram of an exemplary method for diverting children from restricted computing activities.

FIG. 3 is a flow diagram of an exemplary computer-implemented method 300 for diverting children from restricted computing activities. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. At step 302 in FIG. 3, one or more of the systems described herein may maintain a list of safe computing activities. For example, storage module 104 in FIG. 1 (which may, as detailed above, represent a portion of computing system 202 in FIG. 2) may maintain a list of safe computing activities.

Storage module 104 may maintain a list of safe computing activities in a variety of ways. For example, storage module 104 may store information identifying one or more safe computing activities in a database, such as database of safe computing activities 122, or in any other data storage entity. As used herein, the phrase "list of safe computing activities" generally refers to any database, data structure, document, and/or other data storage entity that identifies one or more safe computing activities. The phrase "safe computing activities" generally refers to any computing activities that may be safe for a child of a particular age to engage in. For example, safe computing activities may include computing activities identified by a parent, default activities provided by a security software company, and/or activities identified in any other suitable way. In some embodiments, safe computing activities may be activities indicated as being approved by one or more parental-control policies. Additionally or alternatively, a list of safe computing activities may be maintained separate from parental-control policies that govern a child's computer usage.

In some embodiments, the list of safe computing activities may include one or more uniform resource locators ("URLs") that identify one or more safe websites. The list of safe computing activities may also identify a computer game, a media file (e.g., an MP3 file, a picture file, a movie file, etc.), a recommendation of a safe computing activity for the child, educational information, instant messaging programs, e-mail programs, social-networking websites, and/or any other safe computing activities.

The list of safe computing activities may be maintained in a variety of ways. For example, storage module 104 may monitor computing activities of the child and may add one or more computing activities performed by the child to the list of safe computing activities. Computing activities engaged in by a child may be presumed to be safe for a child if parental-control software is monitoring the child's activities and prohibiting the child from engaging in restricted activities. One advantage of monitoring the child's computing activities and using activities the child actually engages in for the list of safe computing activities is that such activities may be activities the child is actually interested in and may have a greater possibility of diverting the child's attention from restricted computing activities.

In some embodiments, storage module 104 may maintain the list of safe computing activities by identifying one or more computing activities that are most frequently performed by the child and adding these computing activities to the list of safe computing activities. For example, storage module 104 may keep a record of how often a child performs a particular computing activity. As an example, a child may play a computer game several times a day while only occasionally using a word processing program. In such a situation, storage module 104 may add the computer game to the list of safe computing activities while not including using a word processor in the list of safe computing activities. The frequency with which a computing activity is performed may be tracked in any suitable manner, and any suitable heuristic or algorithm may be implemented to determine which activity or activities are more frequently performed than others.

According to various embodiments, storage module 104 may maintain the list of safe computing activities by identifying an interest of the child through monitoring computing activities of the child. For example, storage module 104 may determine that a child is interested in sports by determining that a child frequently performs Internet searches for various sporting teams and events. Storage module 104 may also track the child's conversations in instant messages and e-mails and may determine that the child frequently discusses sports in such messages.

After identifying the interest of the child, storage module 104 may identify a computing activity that is associated with the interest of the child. For example, storage module 104 may access a database that organizes safe computing activities based on category. Continuing with the previous example, one of the categories may be sports, and storage module 104 may add the computing activities associated with the sports category to the list of safe computing activities. Such activities may include sports websites, sports games, and/or other computing activities associated with sports.

In addition to or instead of monitoring the child's computing activities to determine a child's interests, storage module 104 may receive information identifying an interest of the child through a user interface. The child, a parent or guardian, or any other administrator may provide such information. Storage module 104 may then select a computing activity associated with the interest of the child and may add the computing activity associated with the interest of the child to the list of safe computing activities.

In some embodiments, storage module 104 may maintain the list of safe computing activities by receiving computing activities via an interface, a network connection, or through any other suitable mechanism. For example, a parent may identify one or more safe computing activities for the child and these activities may be added to the list of safe computing activities. In some embodiments, a security software provider may provide a predefined database of safe computing activities and/or may provide periodic updates that identify safe computing activities for the child.

In some embodiments, a profile of the child's interests and/or other information about the child may be maintained by storage module 104. Such a profile may help storage module 104 make decisions about computing activities of interest to the child that may be useful to include in the list of safe computing activities. The child's profile may include various types of information about the child, such as the child's interests, the child's gender, the child's age, and/or the child's computer usage patterns.

At step 304 in FIG. 3, one or more of the systems described herein may maintain a list of restricted computing activities. For example, storage module 104 in FIG. 1 (which may, as detailed above, represent the portion of computing system 202 in FIG. 2) may maintain a list of restricted computing activities. A list of restricted computing activities may generally include one or more activities that a child is prohibited or otherwise restricted from engaging in. In some embodiments, the list of restricted computing activities may include and/or be defined by one or more parental-control policies. Parental-control policies may include policies and/or settings that control access to computing activities. Parental-control policies may include policies that restrict, limit, prohibit, or otherwise control activities of children. For example, parental-control policies may include policies that limit access to various types of objectionable content and/or content that may be inappropriate for a child of a particular age. In some embodiments, a parental-control policy may set forth approved or prohibited websites. In certain embodiments, a parental-control policy may control a time period defining when a child may access data (e.g., a time limit on a child's Internet usage). A parental-control policy may also control which applications a child may execute. In some embodiments, a parental-control policy may set forth file permissions for a child and/or may define access control for other computer resources.

At step 306 in FIG. 3, one or more of the systems described herein may detect a child's attempt to perform a restricted computing activity identified in the list of restricted computing activities. For example, detection module 106 in FIG. 1 (which may, as detailed above, represent a portion of computing system 202 in FIG. 2) may detect a child's attempts to perform a restricted computing activity identified in the list of restricted computing activities. As previously mentioned, the list of computing activities may include a list of one or more restricted websites. In such embodiments, detecting the child's attempt to perform the restricted computing activity may include detecting an attempt to direct the Web browser to a restricted website identified in the list of restricted websites. As another example, the list of restricted computing activities may include a time limit on how long the child may surf the Internet. Once the child exceeds the time limit, detection module 106 may determine that a child is attempting to perform a restricted computing activity by attempting to continue to surf the Internet. As additional examples, detection module 106 may detect a child's attempt to perform a restricted computing activity by detecting that a child is attempting to open a game that the child is not allowed to play, a media file that the child is not allowed to view, and/or by detecting any other prohibited or restricted activity of the child.

At step 308 in FIG. 3, one or more of the systems described herein may select a safe computing activity from the list of safe computing activities. For example, selection module 108 in FIG. 1 (which may, as detailed above, represent a portion of computing system 202 in FIG. 2) may select a safe computing activity from the list of safe computing activities. While step 308 is shown as being performed after step 306, step 308 may be performed at any time. For example, a safe computing activity may be identified before a child attempts to engage in a restricted computing activity, after a child attempts to engage in a restricted computing activity, or at any other time.

Selection module 108 may select a safe computing activity in a variety of ways. For example, selection module 108 may select a safe computing activity by selecting a random computing activity from the list of safe computing activities. Alternatively, selection module 108 may select a safe computing activity by selecting a computing activity that has not recently been selected to divert the child's attention from a restricted computing activity. For example, selection module 108 may cycle through a list of ten safe computing activities, using computing activity 1 the first time a child attempts to perform a restricted computing activity, selecting computing activity 2 the second time the child attempts to perform a restricted computing activity, and so on. After all ten computing activities have been used, selection module 108 may start from the beginning of the list again. By selecting computing activities in such a manner, selection module 108 may select different computing activities to hold a child's interest rather than repeatedly trying to divert the child with the same computing activity. Any other suitable algorithm or heuristic may also be used to select a computing activity from the list of safe computing activities.

In some embodiments, selection module 108 may select a safe computing activity by selecting an activity related to the restricted activity the child attempted to perform. For example, if the child tried to browse to a restricted website, selection module 108 may redirect the child to a safe website. More specifically, if the child tried to browse to a restricted social networking website, the selection module may select a safe social networking website.

At step 310 in FIG. 3, one or more of the systems described herein may block the restricted computing activity and initialize the safe computing activity that was selected from the list of safe computing activities. Diversion module 110 may block the restricted computing activity by preventing the child from engaging in the restricted computing activity. Diversion module 110 may initialize a safe computing activity in a variety of different manners, depending on which safe computing activity was selected. For example, diversion module 110 may initialize the safe computing activity by starting a game, by redirecting a Web browser to a safe website, by presenting the child with an interesting fact that may be of interest to the child, by providing the child with a puzzle to solve, by giving the child a suggestion of a movie to watch or a song to listen to, and/or by initializing a safe computing activity in any other manner. In some embodiments, if the child is being restricted from a computing activity because the child has engaged in the computing activity for too long (e.g., the child has spent more than his/her allotted time surfing the Internet), the safe computing activity that is initialized may be a computing activity other than the computing activity the child has been engaging in.

According to some embodiments, diversion module 110 may also provide a notification that provides the child with a reason why the restricted computing activity is being blocked. The notification may explain why the computing activity is bad or being restricted and in some embodiments the notification may also suggest other safe activities that the child may engage in.

Figure 4:
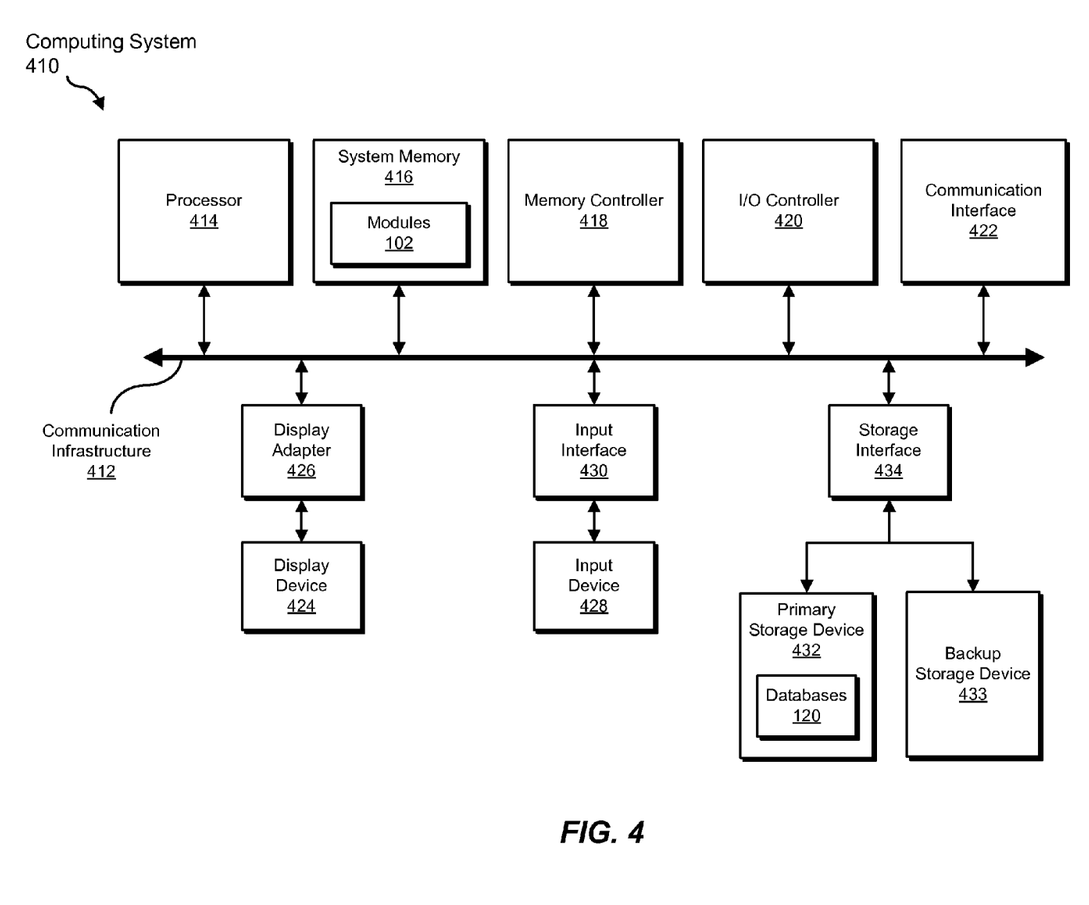
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the maintaining, detecting, selecting, blocking, initializing, monitoring, adding, identifying, receiving, and providing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the steps or features described and/or illustrated herein, such as maintaining, detecting, selecting, blocking, initializing, monitoring, adding, identifying, receiving, and providing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the maintaining, detecting, selecting, blocking, initializing, monitoring, adding, identifying, receiving, and providing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the maintaining, detecting, selecting, blocking, initializing, monitoring, adding, identifying, receiving, and providing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the maintaining, detecting, selecting, blocking, initializing, monitoring, adding, identifying, receiving, and providing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410. In one example, databases 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the maintaining, detecting, selecting, blocking, initializing, monitoring, adding, identifying, receiving, and providing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
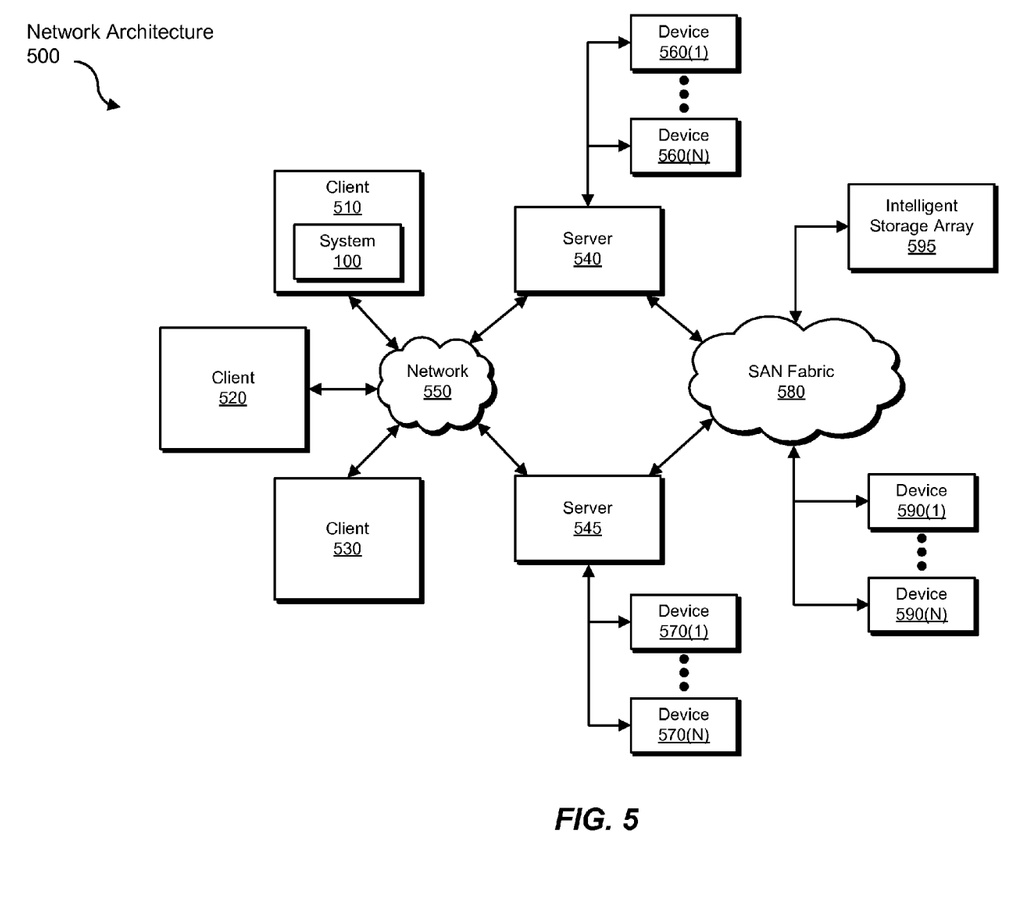
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. In one example, client system 510 may include system 100 from FIG. 1.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the maintaining, detecting, selecting, blocking, initializing, monitoring, adding, identifying, receiving, and providing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for diverting children from restricted computing activities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, data may be scanned, from, and/or to a cloud computing environment and/or one or more of modules 102 may operate in a cloud computing environment.

In addition, one or more of the modules described herein may transform data, physical devices, and/or representations of physical devices from one form to another. For example, one or more of the modules disclosed herein may transform at request to perform a restricted computing activity to a request to initialize a safe computing activity.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for diverting children from restricted computing activities, at least a portion of the method being performed by a computing device comprising at least one processor, the method comprising:
   maintaining a list of safe computing activities that are associated with one or more interests of a child;
   maintaining a list of restricted computing activities;
   detecting an attempt by the child to perform a restricted computing activity identified in the list of restricted computing activities;
   in response to detecting the attempt to perform the restricted computing activity, selecting a safe computing activity from the list of safe computing activities;
   blocking the restricted computing activity;
   in response to detecting the attempt to perform the restricted computing activity and after selecting the safe computing activity, initializing the safe computing activity for the child such that attention of the child is diverted from the restricted computing activity to the safe computing activity.

2. The computer-implemented method of claim 1, wherein:
   the list of restricted computing activities comprises a list of one or more restricted websites;
   detecting the child's attempt to perform the restricted computing activity comprises detecting an attempt to direct a web browser to a restricted website identified in the list of restricted websites.

3. The computer-implemented method of claim 2, wherein:
   the list of safe computing activities comprises a list of safe websites;
   selecting a safe computing activity comprises selecting a safe website from the list of safe websites;

initializing the safe computing activity comprises redirecting the web browser to the safe website.

4. The computer-implemented method of claim 1, wherein maintaining the list of safe computing activities comprises:
monitoring computing activities of the child;
adding one or more computing activities performed by the child to the list of safe computing activities.

5. The computer-implemented method of claim 1, wherein maintaining the list of safe computing activities comprises:
identifying one or more computing activities that are most frequently performed by the child;
adding the one or more computing activities that are most frequently performed by the child to the list of safe computing activities.

6. The computer-implemented method of claim 1, wherein maintaining the list of safe computing activities comprises:
identifying an interest of the child by monitoring computing activities of the child;
identifying a computing activity that is associated with the interest of the child;
adding the computing activity associated with the interest of the child to the list of safe computing activities.

7. The computer-implemented method of claim 1, wherein maintaining the list of safe computing activities comprises:
receiving, via user interface, information identifying an interest of the child;
selecting a computing activity associated with the interest of the child;
adding the computing activity associated with the interest of the child to the list of safe computing activities.

8. The computer-implemented method of claim 1, wherein maintaining the list of safe computing activities comprises:
receiving, via a user interface, information identifying a computing activity to be added to the list of safe computing activities;
adding the computing activity identified via the user interface to the list of safe computing activities.

9. The computer-implemented method of claim 1, wherein:
selecting a safe computing activity from the list of safe computing activities comprises selecting a random computing activity from the list of safe computing activities.

10. The computer-implemented method of claim 1, wherein:
selecting a safe computing activity from the list of safe computing activities comprises selecting a computing activity that has not recently been selected to divert the child's attention from a restricted computing activity.

11. The computer-implemented method of claim 1, wherein:
the list of safe computing activities comprises a URL identifying a safe website.

12. The computer-implemented method of claim 1, wherein the list of safe computing activities identifies at least one of:
a computer game;
a media file;
a recommendation of a safe computing activity for the child;
educational information.

13. The computer-implemented method of claim 1, further comprising:
providing a notification that provides the child with a reason that the restricted computing activity is being blocked.

14. A system for diverting children from restricted computing activities, the system comprising:
a storage module programmed to:
maintain a list of safe computing activities that are associated with one or more interests of a child;
maintain a list of restricted computing activities;
a detection module programmed to detect an attempt by the child to perform a restricted computing activity identified in the list of restricted computing activities;
a selection module programmed to, in response to detecting the attempt to perform the restricted computing activity, select a safe computing activity from the list of safe computing activities;
a diversion module programmed to:
block the restricted computing activity;
in response to detecting the attempt to perform the restricted computing activity and after selecting the safe computing activity, initialize the safe computing activity for the child such that attention of the child is diverted from the restricted computing activity to the safe computing activity;
at least one processor programmed to execute the storage module, the detection module, the selection module, and the diversion module.

15. The system of claim 14, wherein:
the list of restricted computing activities comprises a list of one or more restricted websites;
the detection module is programmed to detect the child's attempt to perform the restricted computing activity by detecting an attempt to direct a web browser to a restricted website identified in the list of restricted websites.

16. The system of claim 15, wherein:
the list of safe computing activities comprises a list of safe websites;
the selection module is programmed to select a safe computing activity by selecting a safe website from the list of safe websites;
the diversion module is programmed to initialize the safe computing activity by redirecting the web browser to the safe website.

17. The system of claim 14, wherein the storage module is programmed to maintain the list of safe computing activities by:
monitoring computing activities of the child;
adding one or more computing activities performed by the child to the list of safe computing activities.

18. The system of claim 14, wherein the storage module is programmed to maintain the list of safe computing activities by:
identifying an interest of the child;
identifying a computing activity that is associated with the interest of the child;
adding the computing activity associated with the interest of the child to the list of safe computing activities.

19. The system of claim 14, wherein the list of safe computing activities identifies at least one of:
a computer game;
a media file;
a recommendation of a safe computing activity for the child;
educational information.

20. A non-transitory computer-readable-storage medium comprising one or more computer-executable instructions that, when executed by at least one processor of a computing device, cause the computing device to:
maintain a list of safe computing activities that are associated with one or more interests of a child;
maintain a list of restricted computing activities;

detect an attempt by the child to perform a restricted computing activity identified in the list of restricted computing activities;

in response to detecting the attempt to perform the restricted computing activity, select a safe computing activity from the list of safe computing activities;

block the restricted computing activity;

in response to detecting the attempt to perform the restricted computing activity and after selecting the safe computing activity, initialize the safe computing activity for the child such that attention of the child is diverted from the restricted computing activity to the safe computing activity.

\* \* \* \* \*